United States Patent
Kozub et al.

(10) Patent No.: US 10,909,663 B2
(45) Date of Patent: Feb. 2, 2021

(54) PROCESSING A DIGITAL IMAGE

(71) Applicants: Danylo Kozub, Kharkov (UA); Iurii Shapoval, Kharkov (UA)

(72) Inventors: Danylo Kozub, Kharkov (UA); Iurii Shapoval, Kharkov (UA)

(*) Notice: Subject to any disclaimer, the term of this patent is extended or adjusted under 35 U.S.C. 154(b) by 55 days.

(21) Appl. No.: 16/504,356

(22) Filed: Jul. 8, 2019

(65) Prior Publication Data

US 2019/0333193 A1    Oct. 31, 2019

Related U.S. Application Data

(63) Continuation-in-part of application No. 15/433,024, filed on Feb. 15, 2017, now abandoned.

(51) Int. Cl.
    *G06T 5/20*    (2006.01)
    *G06T 5/00*    (2006.01)
    *G06T 5/50*    (2006.01)

(52) U.S. Cl.
    CPC ............. *G06T 5/002* (2013.01); *G06T 5/20* (2013.01); *G06T 5/50* (2013.01); *G06T 2207/10024* (2013.01); *G06T 2207/20192* (2013.01); *G06T 2207/20216* (2013.01)

(58) Field of Classification Search
    CPC . G06T 5/002; G06T 2207/10024; G06K 9/44; H04N 1/4097
    See application file for complete search history.

(56) References Cited

U.S. PATENT DOCUMENTS

| | | | |
|---|---|---|---|
| 6,782,297 B2 | 8/2004 | Tabor | |
| 9,405,389 B2 | 8/2016 | Beissinger | |
| 9,451,165 B2 | 9/2016 | Okuhira et al. | |
| 2002/0054395 A1* | 5/2002 | Kubo | G06T 5/20 358/518 |
| 2015/0358547 A1* | 12/2015 | Okuhira et al. | G06T 5/002 348/208.4 |

OTHER PUBLICATIONS

Bernd Jahne, "Digital Image Processing", Springer, 1997, ISBN 3-540-62724-3, pp. 316-319. (Year: 1997).*

Rafael C. Gonzalez, "Digital Image Processing", Addison Wesley Publishing Company, 1979, ISBN 0-201-02597-5, pp. 136-155. (Year: 1979).*

(Continued)

*Primary Examiner* — Brian Werner

(57) ABSTRACT

A method of processing a digital image, the method comprising receiving a digital image, modifying each row of pixel colour values and then each column of modified pixel colour values or vice versa, represented as an array X of pixel or modified pixel colour values x(i), by calculating each value y(i) of an array Y as a function at least of an exponentially weighted moving average a(i) of the array X, calculated in ascending order of the array X value indices, and an exponentially weighted moving average b(i) of the array X, calculated in descending order of the array X value indices, or an exponentially weighted moving average b'(j) of an array X' containing the values of the array X in reverse order, calculated in ascending order of the array X' value indices, where i, j are the array value indices, wherein $0 \le i < N$, $j = N-1-i$, N is the array size, with replacement of x(i) with y(i).

30 Claims, 4 Drawing Sheets

(56) References Cited

OTHER PUBLICATIONS

Rafael C. Gonzalez, "Digital Image Processing", Addison Wesley Publishing Company, 1992, ISBN 0-201-50803-6, pp. 202-209. (Year: 1992).*
Gregory A. Baxes, "Digital Image Processing", John Wiley and Sons, Inc., 1994, ISBN 0-471-00949-0, pp. 88-93. (Year: 1994).*
Steven W. Smith, "Moving Average Filters", Digital Signal Processing: A Practical Guide for Engineers and Scientists, 2003, cover page and pp. 277-284. (Year: 2003).*
Jihao Yin et al., "Hyperspectral Image Target Detection Based on Exponential Smoothing Method", IGARSS 2015, IEEE publication, pp. 1869-1872. (Year: 2015).*

* cited by examiner

PROCESSING A DIGITAL IMAGE

FIELD OF THE INVENTION

The invention relates to processing a digital image using data smoothing methods.

BACKGROUND OF THE INVENTION

Image acquisition and processing is an essential component of operation of many modern machines and devices. Self-driving cars analyze traffic conditions, video surveillance cameras detect moving objects, packing machines track the movement of goods on a conveyor belt, smartphones recognize objects. All these and other applications require real-time image processing at a maximum speed.

Frequency filtering is one of basic image processing operations that consists in presenting an image as a sum of images with different frequencies, similar to audio and radio signal processing. For instance, the finest pixel-size details correspond to high frequencies, the background—to low frequencies. This kind of differentiation simplifies image analysis. For example, this allows for detection of object edges (high frequencies) on a background of different color and brightness (low frequencies).

One of the most popular methods of frequency processing of images is subtraction of blurred image with details and abrupt changes of brightness being smoothed, from the original image. This kind of subtraction allows producing an image with high frequencies—details, noises, edges—and is widely used in computer vision, camera focusing, focus stacking and other applications.

Image smoothing is the most time-consuming and computer-intensive task in frequency filtering. It's mainly caused by the fact that in order to produce a resulting pixel, multiple pixels in its locality need to be processed. At its simplest, smoothing uses weight matrix (kernel) with odd dimensions (3×3, 5×5 . . . ), with the central element corresponding to the resulting pixel. This operation is called convolution, it requires quite a lot of time, especially with increase of kernel size and image resolution.

Some kernels, for instance, Gaussian kernel, are separable, which means that use of square kernel can be replaced by consecutive application of one-pixel wide vertical and one-pixel high horizontal kernel. This decreases computational complexity of algorithm from R*R to 2*R, where R is a number of initial values on each axis needed for computation of one resulting pixel.

However, even 2*R complexity means that smoothing time increases proportionally to the smoothing radius R. Since typical camera and display resolution is constantly increasing, smoothing becomes challenging for real-time applications, such as, for instance, computer games or visual effects on smartphones.

Therefore, image smoothing is an essential element in operation of almost any device that does image processing, and the efficiency of this operation affects consumer properties of the device.

Among the existing techniques, special mention should be made of exponentially weighted moving average characterized by recursive calculation of output values, whereby the amount of calculations does not depend on the degree of smoothing. Thus, this technique is much more efficient from the point of view of calculations.

However, at the same time, the exponentially weighted moving average is characterized by two main drawbacks: partial transfer of input data in the smoothing direction (on the graph it looks like absence of smoothing of the extreme left input value and a shift in the smoothing direction, on the image it looks like blurring of the original image with a shift to the right) and the exponential shape of the blur that does not look like a conventional Gaussian blur.

SUMMARY OF THE INVENTION

According to the present invention, the problem of the prior art is solved by receiving a digital image representing a two-dimensional array of pixel colour values arranged in rows and columns, modifying each row of pixel colour values and then each column of modified pixel colour values or, alternatively, each column of pixel colour values and then each row of modified pixel colour values, represented as an array X of pixel or modified pixel colour values x(i), by calculating each value y(i) of an array Y as a function at least of an exponentially weighted moving average a(i) of the array X, calculated in ascending order of the array X value indices, and an exponentially weighted moving average b(i) of the array X, calculated in descending order of the array X value indices, or an exponentially weighted moving average b'(j) of an array X' containing the values of the array X in reverse order, calculated in ascending order of the array X' value indices, where i, j are the array value indices, wherein $0 \leq i < N$, $j = N-1-i$, N is the array size, with replacement of x(i) with y(i).

The Summary of the Invention is provided to introduce the main concept of the invention in a simplified form that is further described below in the Detailed Description of the Invention. The Summary of the Invention is not intended to identify essential features of the claimed subject matter, nor is it intended to be used to limit the scope of the claimed subject matter.

DETAILED DESCRIPTION OF THE INVENTION

Figure 1:
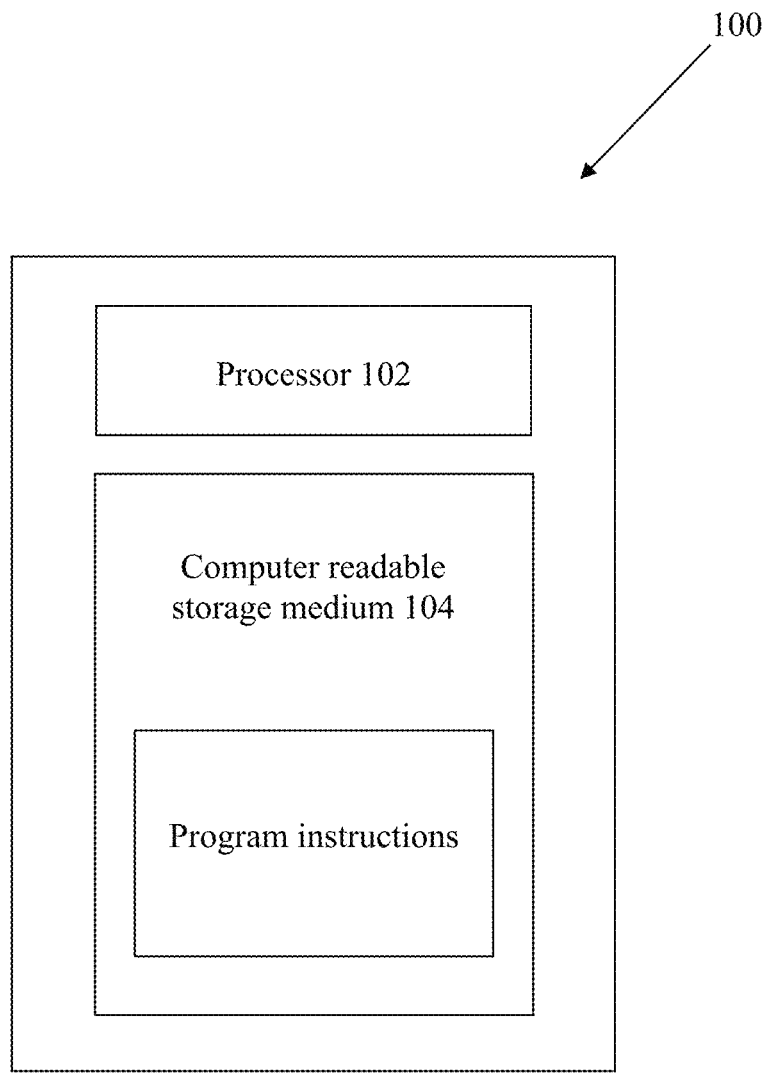
FIG. 1 is a pictorial diagram of an example embodiment of a computer system implementing the method of processing a digital image.

In order to explain the invention, this description begins with more detailed information about the method of processing a digital image using exponentially weighted moving average technique, emphasizing the points causing drawbacks of the method.

It should be noted that exponentially weighted moving average uses one-dimensional data array rather than two-dimensional one, so it should be used for image processing as a separable kernel, i.e. should be applied twice consecutively—once to rows of initial pixels, and the second time to columns of resulting pixels or in reverse order. In view of the foregoing, hereinafter we will only describe operations for one-dimensional array.

In the most general case, an exponentially weighted moving average is calculated according to the equation $$a_{(i)}=a_{(i-1)}*w+x_{(i)}*(1-w),$$

where i is an index of the value of the input value array, 0≤i<N, and N is the array size.

The said method results in partial transfer of the input data in the smoothing direction, i.e. in the direction of output values. This is because the exponentially weighted moving average is calculated recursively, i.e. each new smoothed value $a_{(i)}$ is calculated as a weighted average of the current input value $x_{(i)}$ and the smoothed value $a_{(i-1)}$. Here, the subsequent input values have no effect on smoothing, therefore, smoothing is asymmetrical. The first input value $x_{(0)}$ is not smoothed since there is no smoothed value $a_{(0-1)}$ for it, so normally the input value itself is used instead of the smoothed one $$a_{(0)}=x_{(0)}.$$

Another possible embodiment of smoothing using exponentially weighted moving average technique supposes smoothing of the first input value $x_{(0)}$ using a technique that does not require a smoothed value $a_{(i-1)}$ for calculation, which negatively affects the overall computational efficiency due to combination of techniques.

According to the claimed computer-implemented method of processing a digital image representing a two-dimensional array of pixel colour values arranged in rows and columns by modifying each row of pixel colour values and then each column of modified pixel colour values or, alternatively, each column of pixel colour values and then each row of modified pixel colour values, represented as an array X of pixel or modified pixel colour values x(i), by calculating each value y(i) of an array Y with replacement of x(i) with y(i), instead of using just an exponentially weighted moving average for data smoothing, it is suggested to calculate each value $y_{(i)}$ of the array Y as a function of at least two exponentially weighted moving averages:

an exponentially weighted moving average $a_{(i)}$ of the array X, calculated in ascending order of the array X value indices, and an exponentially weighted moving average $b_{(i)}$ of the array X, calculated in descending order of the array X value indices. As an alternative to the latter, an exponentially weighted moving average $b'_{(j)}$ of the array X' containing the values of the array X in reverse order, calculated in ascending order of the array X' value indices may be used, where i, j are the array value indices, wherein 0≤i<N, j=N-1-i, N is the array size.

Said alternative features together with other essential features of the method provide the same result within the method according to the present invention.

Therefore, the output value $y_{(i)}$ is determined based on at least two exponentially weighted moving averages calculated in two different directions of the array of input values $x_{(i)}$: in ascending order of the array X value indices and in descending order of said indices, which compensates the directed partial transfer of data in course of smoothing and therefore provides symmetry of smoothing with simultaneous smoothing of both extreme input values. This method allows for compensation of drawbacks of the conventional exponentially weighted moving average, while preserving its advantages. The result of smoothing becomes symmetrical, with the shape similar to Gaussian blur, while the method itself preserves high computational efficiency.

The phrase "at least two exponentially weighted moving averages" means that in some embodiments of the present invention, depending on the field of application of smoothing, the other variables may be used along with $a_{(i)}$ and $b_{(i)}/b'_{(j)}$ for calculation of the output value $y_{(i)}$, in particular the input values $x_{(i)}/x'_{(j)}$ of the array X/X' per se, and not only as data for calculating $a_{(i)}$ and $b_{(i)}/b'_{(j)}$.

Features «input value» or «input data» ($x_{(i)}$) and «output value» or «output data» ($y_{(i)}$) used in the specification mean values or data subjected to modifying and modified values or data correspondingly. Thus, output values or data $y_{(i)}$ after the first modifying (for example, each row modifying) are input values or data $x_{(i)}$ for the second modifying (each column modifying respectively).

As can be seen from the formula of an exponentially weighted moving average, the computational complexity of the described method does not depend on the smoothing degree. There are also other algorithms that do not depend on the smoothing radius. In particular, box filter allows to achieve smoothing similar to that from Gaussian filter in three successive passes. However, the computational complexity of box filter is much higher.

As noted in the Background of the Invention, the speed of smoothing has direct impact on the consumer properties of a device with image processing. For example, the refresh rate is one of the main criteria in evaluation of game experience. And the speed of object recognition of a surveillance camera determines its potential applications—either in a warehouse or in a crowded street.

Depending on the desired degree of smoothing, different algorithms can be used for calculation of the exponentially weighted moving averages.

In general, the exponentially weighted moving average $a_{(i)}$ is calculated according to the equation $$a_{(i)}=a_{(i-1)}*w+x_{(i)}*(1-w),$$

the exponentially weighted moving average $b_{(i)}$ is calculated according to the equation $$b_{(i)}=b_{(i+1)}*w+x_{(i)}*(1-w),$$

and respectively the exponentially weighted moving average $b'_{(j)}$ is calculated according to the equation $$b'_{(j)}=b'_{(j-1)}*w+x'_{(j)}*(1-w),$$

where w is a smoothing coefficient having a value between 0 and 1, 0<w<1.

This method allows to produce an image smoothed in a way similar to a Gaussian filter smoothing, being the gold standard in frequency filtering. Gaussian smoothing is often used in computer games to blur the background and simulate optical blur, in window managers to display applications behind the active window, as a simple noise removal method, as an element of more complex image processing operations, such as sharpening, edge detection, object detection, etc.

In another embodiment of the present invention, the exponentially weighted moving average $a_{(i)}$ is calculated according to the equation $$a_{(i)}=a_{(i-1)}*s_{(i)}+x_{(i)}*(1-s_{(i)}),$$

the exponentially weighted moving average $b_{(i)}$ is calculated according to the equation $$b_{(i)}=b_{(i+1)}*s_{(i)}+x_{(i)}*(1-s_{(i)}),$$

and, respectively, the exponentially weighted moving average $b'_{(j)}$ is calculated according to the equation $$b'_{(j)}=b'_{(j-1)}*s'_{(j)}+x'_{(j)}*(1-s'_{(j)}),$$

where $s_{(i)}$ are the values of the array S of size N, being smoothing coefficients, $s'_{(j)}$ are the values of the array S' of size N comprising the values of the array S in reverse order.

Smoothing coefficients allow to achieve varying smoothing for different areas of the image. Blurring of the background according to the depth map is one of the applications of this method. This operation is used in smartphones to simulate optical blur at wide aperture values. The blur of each area should depend on the distance to camera. Using the depth map as smoothing coefficients allows to achieve the desired effect. Alternative to this is using convolution with a variable size of kernel, but it requires considerably more computations.

In one of the preferred embodiments of the present invention, the exponentially weighted moving average $a_{(i)}$ is calculated according to the equation $$a_{(i)}=a_{(i-1)}*w+(x_{(i)}+x_{(i-1)})/2*(1-w),$$

the exponentially weighted moving average $b_{(i)}$ is calculated according to the equation $$b_{(i)}=b_{(i+1)}*w+(x_{(i)}+x_{(i+1)})/2*(1-w),$$

and the exponentially weighted moving average $b'_{(j)}$ is calculated according to the equation $$b'_{(j)}=b'_{(j-1)}*w+(x'_{(j)}+x'_{(j-1)})/2*(1-w),$$

where w is a smoothing coefficient having a value between 0 and 1, 0<w<1.

The above embodiment works better with smoothing at a very small radius. For example, the use of box filter requires decreasing the smoothing degree to the size of the filter kernel, for example, to 7, 5 or 3 pixels. When processing images, it's often needed to gradually change the smoothing degree, from 0 to large values. The proposed embodiment produces a good shape of blur, especially for very small degrees of blur. This can be useful for image sharpening and detection of very high frequencies on the image, for example when focusing.

In this embodiment, the averages of two adjacent input values of the array (depending on the smoothing direction) are used instead of the input values of the array as input data for calculating the exponentially weighted moving averages $a_{(i)}$ and $b_{(i)}/b'_{(j)}$.

In another particular embodiment of the invention, the exponentially weighted moving average $a_{(i)}$ is calculated according to the equation $$a_{(i)}=a_{(i-1)}*s_{(i)}+(x_{(i)}+x_{(i-1)})/2*(1-s_{(i)}),$$

the exponentially weighted moving average $b_{(i)}$ is calculated according to the equation $$b_{(i)}=b_{(i+1)}*s_{(i)}+(x_{(i)}+x_{(i+1)})/2*(1-s_{(i)}),$$

and the exponentially weighted moving average $b'_{(j)}$ is calculated according to the equation $$b'_{(j)}=b'_{(j-1)}*s'_{(j)}+(x'_{(j)}+x'_{(j-1)})/2*(1-s'_{(j)}),$$

where $s_{(i)}$ are the values of the array S of size N, being smoothing coefficients, $s'_{(j)}$ are the values of the array S' of size N comprising the values of the array S in reverse order.

The array S can be used to change the degree of smoothing for individual values of the array X. Thus, the values $x_{(i)}$ corresponding to the larger value $s_{(i)}$, will be of less weight in the output data, i.e. will be smoothed more.

This embodiment can be used to simulate background blur. In this case, smoothing coefficients are determined on the basis of a depth map, where each pixel value corresponds to the distance from the camera to this area.

Besides, this embodiment can be used to smooth the depth map in focus stacking, as described in US2018/0253877, where smoothing coefficients are calculated based on focus estimates of corresponding pixels in the stack of source images.

In one of particular embodiments of the present invention, each value $y_{(i)}$ of the array Y is calculated according to the equation $$y_{(i)}=(a_{(i)}+b_{(i)})/2$$

or $$y_{(i)}=(a_{(i)}+b'_{(j)})/2.$$

In another particular embodiment of the present invention, each value $y_{(i)}$ of the array Y is calculated according to the equation $$y_{(i)}=\mathrm{abs}(x_{(i)}-(a_{(i)}+b_{(i)})/2)\hat{\ }g$$

or $$y_{(i)}=\mathrm{abs}(x_{(i)}-(a_{(i)}+b'_{(j)})/2)\hat{\ }g$$

where g is an exponent, g>0.

The exponent g equalling 2, the equation represents a square of a difference, which is often used to estimate the mean squared error when evaluating the similarity of images. When g equals 1, the equation may be used to estimate the absolute difference. The exponent g being less than 1 allows to reduce the influence of large deviations from unsmoothed values and to increase the influence of small deviations. The values greater than 1 give the opposite effect.

This embodiment is applicable, for instance, in image editing for edge detection and sharpening. This embodiment includes smoothing and detecting the difference from the original image. Sobel filter is often used for this purpose, but its computational complexity is proportional to square of the smoothing radius R, while the complexity of the proposed method does not depend on R.

In still another particular embodiment of the present invention, each value $y_{(i)}$ of the array Y is calculated according to the equation $$y_{(i)}=\max(\min(x_{(i)}, \max(a_{(i)}, b_{(i)})), \min(a_{(i)}, b_{(i)}))$$

or $$y_{(i)}=\max(\min(x_{(i)}, \max(a_{(i)}, b'_{(j)})), \min(a_{(i)}, b'_{(j)})).$$

This embodiment is preferably used, for instance, in image editing for noise reduction, noise filtering, signal filtering. A special feature of this method is that it does not blur the object edges, but eliminates individual pixels that vary greatly from the surrounding ones.

In another particular embodiment of the present invention, each value $y_{(i)}$ of the array Y is calculated according to the equation $$y_{(i)}=\max(a_{(i)}, b_{(i)})$$

or $$y_{(i)}=\max(a_{(i)}, b'_{(j)}).$$

This embodiment is applicable, for example, in image processing for obtaining smoothed images with priority of higher values.

Another particular embodiment of the present invention is the calculation of each value $y_{(i)}$ of the array Y according to the equation $$y_{(i)}=\min(a_{(i)}, b_{(i)})$$

or $$y_{(i)}=\min(a_{(i)}, b'_{(j)}).$$

This embodiment is applicable, for example, in image processing for obtaining smoothed images with priority of lower values.

It should be noted that the above algorithms for calculation of $a_{(i)}$ and $b_{(i)}/b'_{(j)}$, as well as for calculation of the output values $y_{(i)}$ are the examples in the preferred embodiments of the present invention and are not intended for limiting its scope. As such, those skilled in the art will appreciate that other calculation algorithms can be used depending on the final purpose of smoothing.

Combining different algorithms for calculating exponentially weighted moving averages with different algorithms of output values calculation based thereon allows to obtain, for example, various image processing filters.

The present invention is described herein directly through a computer-implemented method of data smoothing, as well as through a computer system with program instructions implementing the said method, and a computer readable medium storing said program instructions that initiate implementation of the aspects of data smoothing method according to the present invention.

The aspects of the present invention are described herein with reference to the drawings.

FIG. 1 illustrates an example of a computer system that can implement the method of processing a digital image as claimed. In the illustrated example, the computer system 100 comprises a processor 102 and a computer readable medium 104 communicatively connected with the processor 102. The computer readable medium stores program instructions executable by said processor 102 and initiating the input data smoothing based on the exponentially weighted moving average $a_{(i)}$ and the exponentially weighted moving average $b_{(i)}$.

The program instructions described herein are executable by at least one or more hardware logic components. Examples of possible types of hardware logic components that can be used (without limitation) include field-programmable gate arrays (FPGAs), application-specific integrated circuits (ASICs), systems-on-a-chip (SOCs), complex programmable logic devices (CPLDs), etc.

Program instructions for carrying out operations of the present invention may be represented by assembler code instructions, instruction-set-architecture (ISA) instructions, machine instructions, machine-dependent instructions, set of micro commands, base software instructions, state data, or another source code or object code written in any combination of one or more programming languages, including object oriented programming languages such as Smalltalk, C++ or the like, and conventional procedural programming languages such as C or C-like programming languages.

The program instructions may be executed entirely on the user's computer, partly on the user's computer as a stand-alone software package, partly on the user's computer and partly on a remote computer or entirely on the remote computer or server. In the latter scenario, the remote computer may be connected to the user's computer through any type of network, including local area network (LAN) and wide area network (WAN), or it can be connected to an external computer (for example, through the Internet using an Internet Service Provider).

In some embodiments, for example, in electronic circuitry, programmable logic devices, field-programmable gate arrays (FPGA), or programmable logic arrays (PLA) can execute computer readable program instructions optimizing the information about the state of such instructions for adjustment of electronic circuitry in order to implement the aspects of the present invention.

The computer readable medium includes volatile and non-volatile, removable and non-removable media applicable in any method or technology of storing such information as computer readable instructions, data structures, program modules, etc.

Computer readable medium may include random access memory (RAM), read-only memory (ROM), electrically-erasable programmable ROM (EEPROM), flash memory or another memory technology, CD-ROM, DVD format compact disc or another optical storage, magnetic cassettes, magnetic tape, magnetic disk storage or other magnetic storage devices, as well as any other non-transmission medium that can be used to store information for access by a computing device. Said computer readable storage medium is a non-transitory one.

Figure 2:
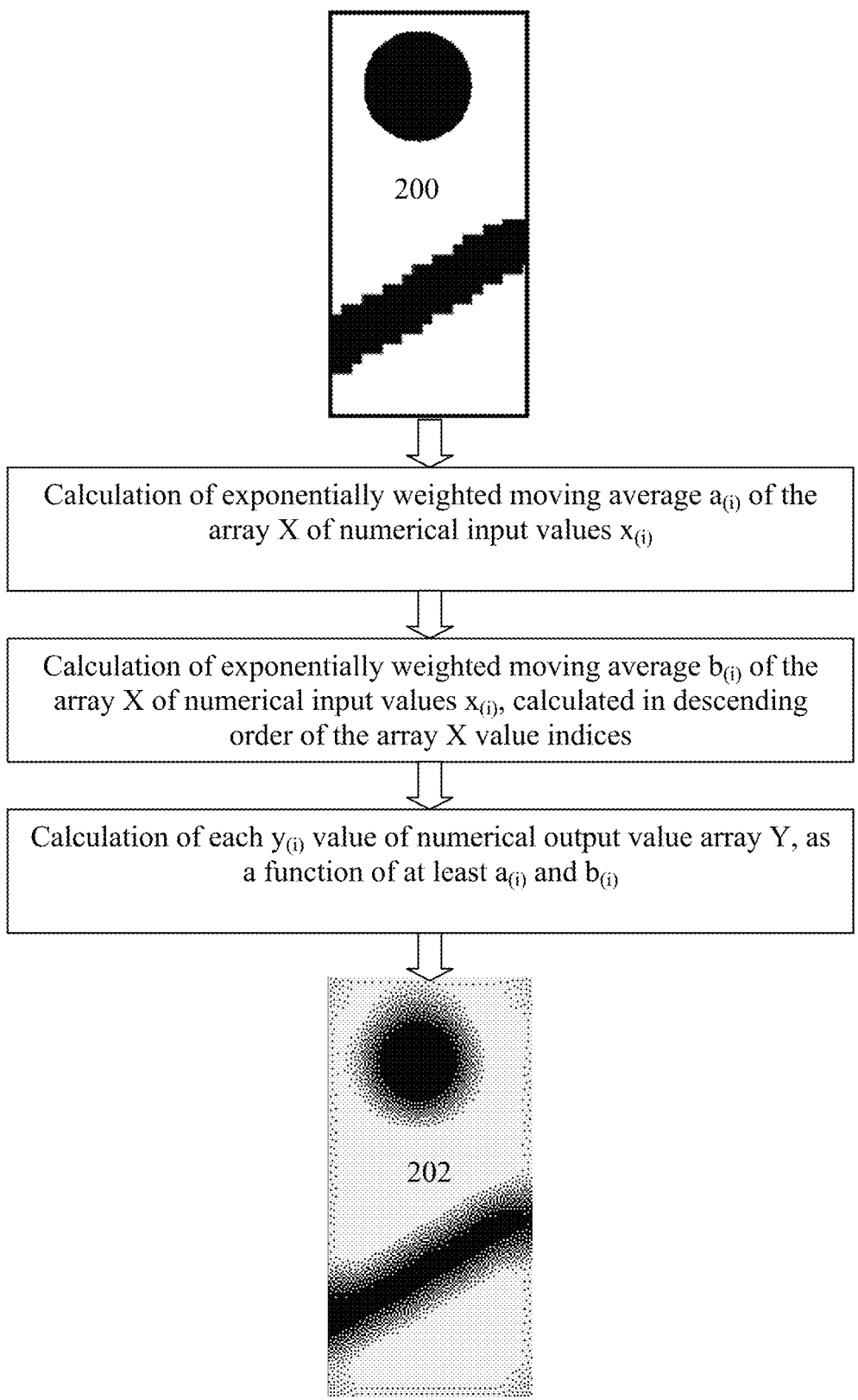
FIG. 2 is a block diagram illustrating an example of input data and a corresponding example of output data after smoothing.

An example of input data and a corresponding example of output data after smoothing are illustrated in general terms as a block diagram in FIG. 2 for the case of editing a digital image 200 to be smoothed. The input values for smoothing are pixel colours of the said digital image 200. Program instructions stored in a computer readable medium 104 initiate the calculation of the exponentially weighted moving average $a_{(i)}$ of the array of the digital image 200 pixel colour input values, the calculation of the exponentially weighted moving average $b_{(i)}$ of the array of the digital image 200 pixel colour input values, and the subsequent calculation of the smoothed output values $y_{(i)}$ on the basis of $a_{(i)}$ and $b_{(i)}$. As a result, a smoothed digital image 202 is obtained.

Figure 3:
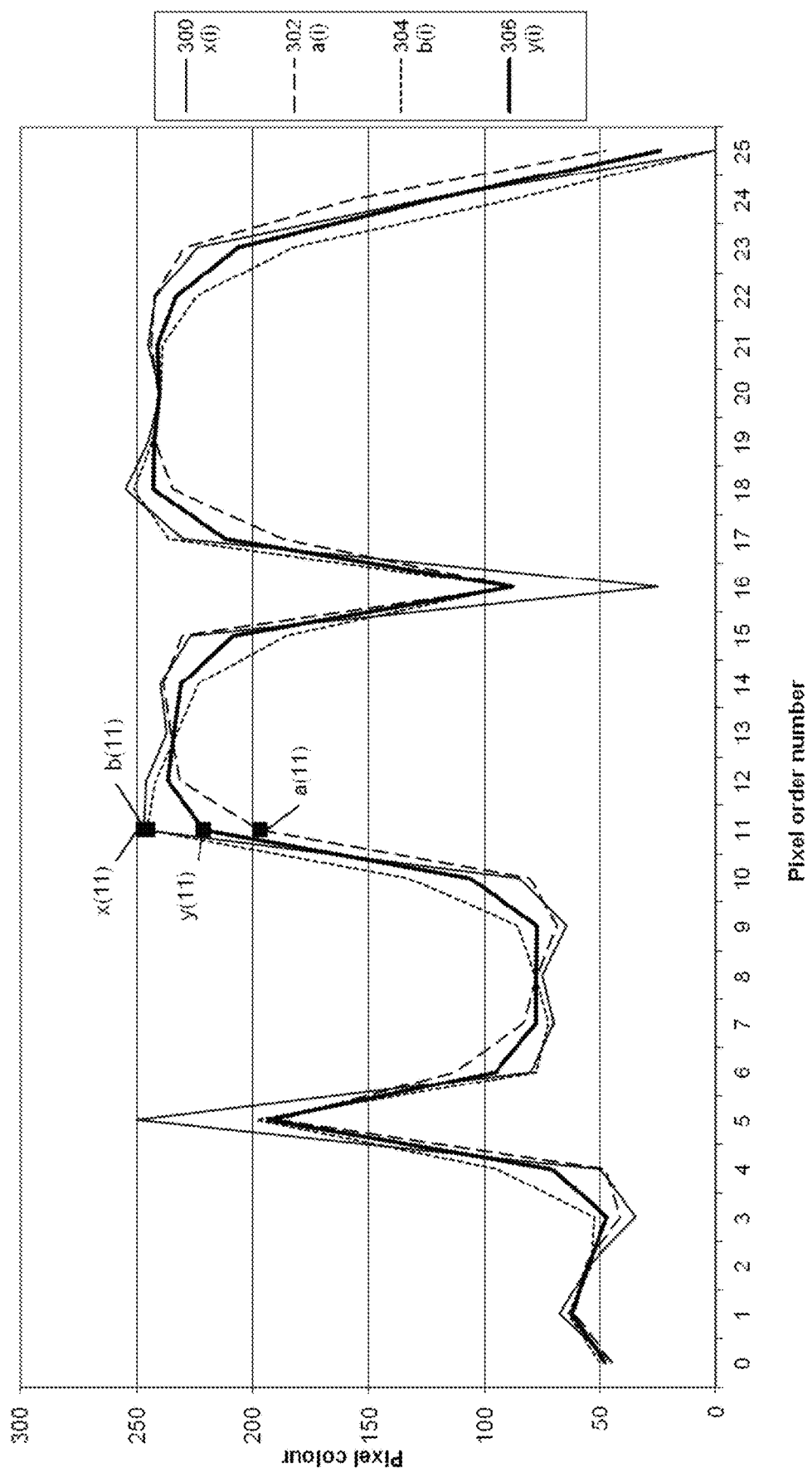
FIG. 3 is an example of data smoothing according to an embodiment of the present invention, shown in the form of graphs.

FIG. 3 illustrates an example of smoothing of input colour values for a sequence of 26 pixels of the digital image 200, presented as graphs. This size of the row was selected for clearer illustration of smoothing according to the method of the present invention. The graph 300 represents an array X of the input colour values of a selected row of pixels. The graph 302 represents an exponentially weighted moving average $a_{(i)}$ calculated in ascending order of the array X value indices, wherein the equation $a_{(i)}=a_{(i-1)}*w+x_{(i)}*(1-w)$ was used for calculation. The graph 304 represents an exponentially weighted moving average $b_{(i)}$ calculated in descending order of the array X value indices, wherein the equation $b_{(i)}=b_{(i+1)}*w+x_{(i)}*(1-w)$ was used for calculation. The graph 306 represents an array Y of the output colour values for the selected row of pixels, wherein each output value $y_{(i)}$ was calculated as an average between $a_{(i)}$ and $b_{(i)}$. In practice, such combination of algorithms may be used to implement edge detection filter.

For illustrative purposes and in order to bring further clarification, the colour values of the eleventh pixel were selected. On the image, this region may be the edge of the depicted object. In this example the exponentially weighted moving average $a_{(11)}$ has a large deviation from the input value $x_{(11)}$, whereas the exponentially weighted moving average $b_{(11)}$, on the contrary, has relatively small deviation and approaches the input value $x_{(11)}$. Since the output value $y_{(11)}$ was calculated on the basis of both $a_{(11)}$ and $b_{(11)}$, the shifts in the smoothing direction were correspondingly compensated.

Figure 4:
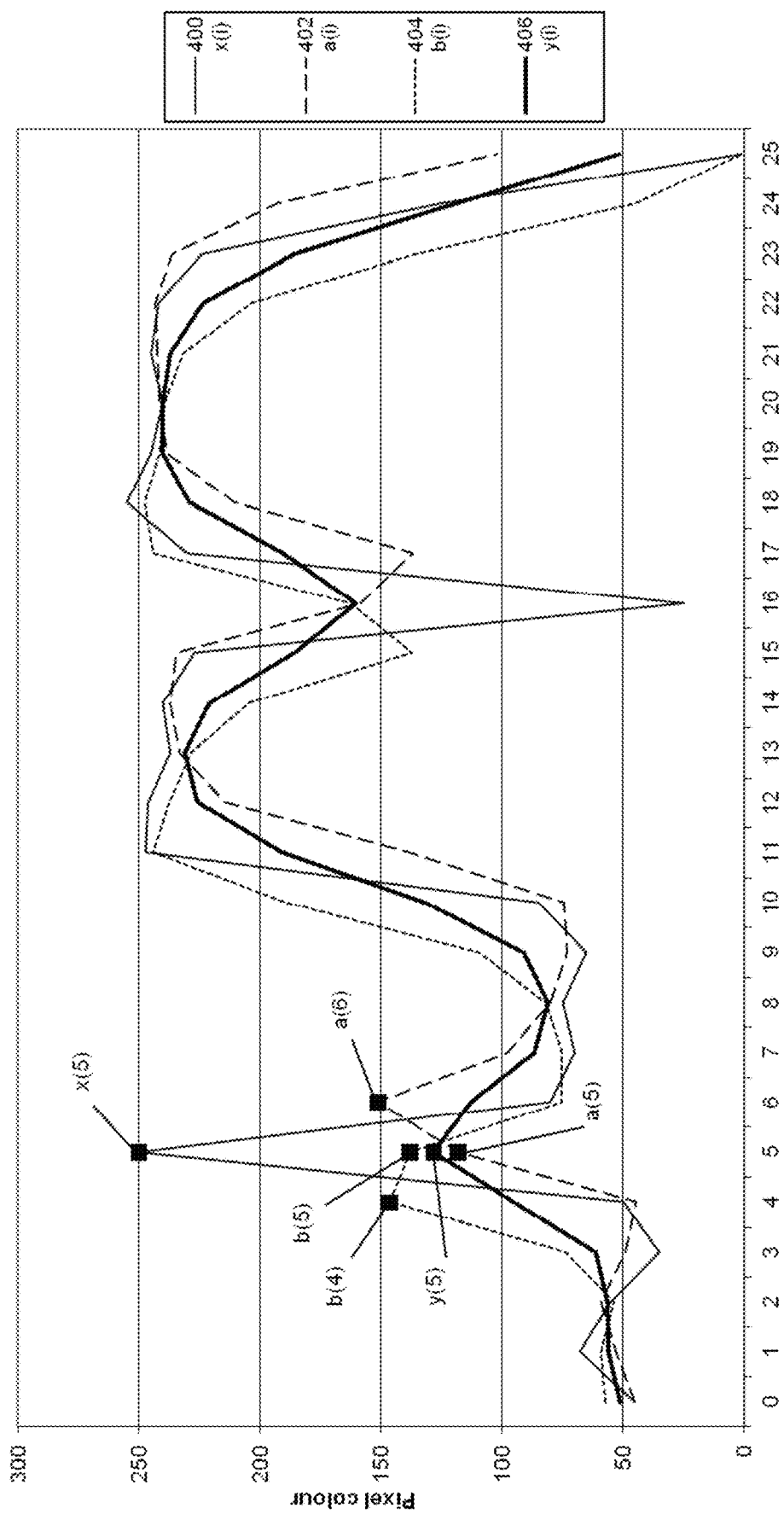
FIG. 4 is an example of data smoothing according to another embodiment of the present invention, shown in the form of graphs.

FIG. 4 illustrates another example of smoothing of a data array similar to the data array of the example in FIG. 3. The graph 400 represents an array X of the input colour values $x_{(i)}$ of a selected successive row of pixels. The graph 402 represents an exponentially weighted moving average $a_{(i)}$ calculated in ascending order of the array X value indices, where the equation $a_{(i)}=a_{(i-1)}*w+(x_{(i)}+x_{(i-1)})/2*(1-w)$ was used for calculation. The graph 404 represents an exponentially weighted moving average $b_{(i)}$ calculated in descending order of the array X value indices, where the equation $b_{(i)}=b_{(i+1)}*w+(x_{(i)}+x_{(i+1)})/2*(1-w)$ was used for calculation. The graph 406 represents an array Y of the output colour values $y_{(i)}$ of a selected row of pixels, wherein each output value $y_{(i)}$ was calculated, like in the previous example, as an average between $a_{(i)}$ and $b_{(i)}$. In practice, such combination of algorithms may also be used to implement edge detection and noise filters.

For illustrative purposes and in order to bring further clarification, a region from the third to the seventh pixel comprising the extreme input value $x_{(5)}$ was selected. In this case, the input data transfer in the smoothing direction (to the right ($a_{(6)}$) and to the left ($b_{(4)}$) respectively) relative to the input value $x_{(5)}$ is observed. Since the output value $y_{(5)}$ was calculated on the basis of both $a_{(5)}$ and $b_{(5)}$, the input data transfer to the right and to the left was compensated, whereby a symmetric blur was obtained.

The present invention and various specific embodiments thereof may be used in many technical fields, non-limiting examples of which are, in particular, commercial image editing tools, medicine, in particular, endoscopy and microscopy, statistical analysis programs, meteorological data processing, financial analysis, digital processing of acoustic and other signals, control of flying objects, motion stabilization, etc.

Besides the data illustrated and described as examples of input values characterising a digital image, the method of data smoothing as described herein may be applied to any type of data. Examples of other types of data include, but are not limited to, input data generated through natural user interface technologies, such as speech recognition, touch and stylus recognition, gesture recognition, gesture control, head and eye tracking, voice and speech, vision, touch, hover, and machine intelligence.

Although the examples of the method of data smoothing were described in a language specific to the structural features and/or methodological steps, it should be understood that the method of data smoothing as defined in the appended claims is not necessarily limited to the specific features or steps described above. Rather, the specific features and steps described above are disclosed as examples of implementing the claims, and other equivalent features and steps can be encompassed by the claims of the present invention.

The invention claimed is:

1. A computer-implemented method of processing a digital image, comprising receiving a digital image representing a two-dimensional array of pixel colour values arranged in rows and columns,
    modifying each row of pixel colour values and then each column of modified pixel colour values or, alternatively, each column of pixel colour values and then each row of modified pixel colour values, represented as an array X of pixel or modified pixel colour values x(i), by calculating each value y(i) of an array Y as a function at least of
        an exponentially weighted moving average a(i) of the array X, calculated in ascending order of the array X value indices, and
        an exponentially weighted moving average b(i) of the array X, calculated in descending order of the array X value indices, or an exponentially weighted moving average b'(j) of an array X' containing the values of the array X in reverse order, calculated in ascending order of the array X' value indices,
        where i, j are the array value indices, wherein $0 \leq i < N$, $j = N-1-i$, N is the array size,
    with replacement of x(i) with y(i).

2. The method of claim 1, characterized in that the method comprises calculating the exponentially weighted moving average $a_{(i)}$ according to the equation $$a_{(i)}=a_{(i-1)}*w+x_{(i)}*(1-w) \text{ and}$$

the exponentially weighted moving average $b_{(i)}$ according to the equation $$b_{(i)}=b_{(i+1)}*w+x_{(i)}*(1-w)$$

or the exponentially weighted moving average $b'_{(j)}$ according to the equation $$b'_{(j)}=b'_{(j-1)}*w+x'_{(j)}*(1-w),$$

where w is a smoothing coefficient.

3. The method of claim 1, characterized in that the method comprises calculating the exponentially weighted moving average $a_{(i)}$ according to the equation $$a_{(i)}=a_{(i-1)}*s_{(i)}+x_{(i)}*(1-s_{(i)}) \text{ and}$$

the exponentially weighted moving average $b_{(i)}$ according to the equation $$b_{(i)}=b_{(i+1)}*s_{(i)}+x_{(i)}*(1-s_{(i)})$$

or the exponentially weighted moving average $b'_{(j)}$ according to the equation $$b'_{(j)}=b'_{(j-1)}*s'_{(j)}+x'_{(j)}*(1-s'_{(j)}),$$

where $s_{(i)}$ are the values of the array S of size N, being smoothing coefficients, $s'_{(j)}$ are the values of the array S' of size N comprising the values of the array S in reverse order.

4. The method of claim 1, characterized in that the method comprises calculating the exponentially weighted moving average $a_{(i)}$ according to the equation $$a_{(i)}=a_{(i-1)}*w+(x_{(i)}+x_{(i-1)})/2*(1-w) \text{ and}$$

the exponentially weighted moving average $b_{(i)}$ according to the equation $$b_{(i)}=b_{(i+1)}*w+(x_{(i)}+x_{(i+1)})/2*(1-w)$$

or the exponentially weighted moving average $b'_{(j)}$ according to the equation $$b'_{(j)}=b'_{(j-1)}*w+(x'_{(j)}+x'_{(j-1)})/2*(1-w),$$

where w is a smoothing coefficient.

5. The method of claim 1, comprises calculating the exponentially weighted moving average $a_{(i)}$ according to the equation $$a_{(i)}=a_{(i-1)}*s_{(i)}+(x_{(i)}+x_{(i-1)})/2*(1-s_{(i)}) \text{ and}$$

the exponentially weighted moving average $b_{(i)}$ according to the equation $$b_{(i)}=b_{(i+1)}*s_{(i)}+(x_{(i)}+x_{(i+1)})/2*(1-s_{(i)})$$

or the exponentially weighted moving average $b'_{(j)}$ according to the equation $$b'_{(j)}=b'_{(j-1)}*s'_{(j)}+(x'_{(j)}+x'_{(j-1)})/2*(1-s'_{(j)}),$$

where $s_{(i)}$ are the values of the array S of size N, being smoothing coefficients, $s'_{(j)}$ are the values of the array S' of size N comprising the values of the array S in reverse order.

6. The method of claim 1, characterized in that the method comprises calculating each value $y_{(i)}$ of the array Y according to the equation $$y_{(i)}=(a_{(i)}+b_{(i)})/2$$

or $$y_{(i)}=(a_{(i)}+b'_{(j)})/2.$$

7. The method of claim 1, characterized in that the method comprises calculating each value $y_{(i)}$ of the array Y according to the equation $$y_{(i)}=\text{abs}(x_{(i)}-(a_{(i)}+b_{(i)})/2)^{\wedge}g$$

or $$y_{(i)}=\text{abs}(x_{(i)}-(a_{(i)}+b'_{(j)})/2))^{\wedge}g,$$

where g is an exponent, g>0.

8. The method of claim 1, characterized in that the method comprises calculating each value $y_{(i)}$ of the array Y according to the equation $$y_{(i)}=\max(\min(x_{(i)},\max(a_{(i)},b_{(i)})),\min(a_{(i)},b_{(i)}))$$

or $$y(i)=\max(\min(x_{(i)},\max(a_{(i)},b'_{(j)})),\min(a_{(i)},b'_{(j)})).$$

9. The method of claim 1, characterized in that the method comprises calculating each value $y_{(i)}$ of the array Y according to the equation $$y_{(i)}=\max(a_{(i)},b_{(i)})$$

or $$y_{(i)}=\max(a_{(i)},b'_{(j)}).$$

10. The method of claim 1, characterized in that the method comprises calculating each value $y_{(i)}$ of the array Y according to the equation $$y_{(i)}=\min(a_{(i)},b_{(i)})$$

or $$y_{(i)}=\min(a_{(i)},b'_{(j)}).$$

11. A computer system comprising
at least one processor,
at least one non-transitory computer readable medium communicatively connected with at least one processor, and
program instructions stored on at least one computer readable medium, being executable by at least one processor and comprising
program instructions for implementing a method of processing a digital image, the method comprising
receiving a digital image representing a two-dimensional array of pixel colour values arranged in rows and columns,
modifying each row of pixel colour values and then each column of modified pixel colour values or, alternatively, each column of pixel colour values and then each row of modified pixel colour values, represented as an array X of pixel or modified pixel colour values x(i), by calculating each value y(i) of an array Y as a function at least of
an exponentially weighted moving average a(i) of the array X, calculated in ascending order of the array X value indices, and
an exponentially weighted moving average b(i) of the array X, calculated in descending order of the array X value indices, or an exponentially weighted moving average b'(j) of an array X' containing the values of the array X in reverse order, calculated in ascending order of the array X' value indices,
where i, j are the array value indices, wherein 0≤i<N, j=N−1−i, N is the array size,
with replacement of x(i) with y(i).

12. The system of claim 11, wherein the program instructions comprise instructions for calculating the exponentially weighted moving average $a_{(i)}$ according to the equation $$a_{(i)}=a_{(i-1)}*w+x_{(i)}*(1-w) \text{ and}$$

the exponentially weighted moving average $b_{(i)}$ according to the equation $$b_{(i)}=b_{(i+1)}*w+x_{(i)}*(1-w)$$

or the exponentially weighted moving average $b'_{(j)}$, according to the equation $$b'_{(j)}=b'_{(j-1)}*w+x'_{(j)}*(1-w),$$

where w is a smoothing coefficient.

13. The system of claim 11, wherein the program instructions comprise instructions for calculating the exponentially weighted moving average $a_{(i)}$ according to the equation $$a_{(i)}=a_{(i-1)}*s_{(i)}+x_{(i)}*(1-s_{(i)}) \text{ and}$$

the exponentially weighted moving average $b_{(i)}$ according to the equation $$b_{(i)}=b_{(i+1)}*s_{(i)}+x_{(i)}*(1-s_{(i)})$$

or the exponentially weighted moving average $b'_{(j)}$ according to the equation $$b'_{(j)}=b'_{(j-1)}*s'_{(j)}+x'_{(j)}*(1-s'_{(j)}),$$

where $s_{(i)}$ are the values of the array S of size N, being smoothing coefficients, $s'_{(j)}$ are the values of the array S' of size N comprising the values of the array S in reverse order.

14. The system of claim 11, wherein the program instructions comprise instructions for calculating the exponentially weighted moving average $a_{(i)}$ according to the equation $$a_{(i)}=a_{(i-1)}*w+(x_{(i)}+x_{(i-1)})/2*(1-w) \text{ and}$$

the exponentially weighted moving average $b_{(i)}$ according to the equation $$b_{(i)}=b_{(i+1)}*w+(x_{(i)}+x_{(i+1)})/2*(1-w)$$

or the exponentially weighted moving average $b'_{(j)}$ according to the equation $$b'_{(j)}=b'_{(j-1)}*w+(x'_{(j)}+x'_{(j-1)})/2*(1-w),$$

where w is a smoothing coefficient.

15. The system of claim 11, wherein the program instructions comprise instructions for calculating the exponentially weighted moving average $a_{(i)}$ according to the equation $$a_{(i)}=a_{(i-1)}*s_{(i)}+(x_{(i)}+x_{(i-1)})/2*(1-s_{(i)}) \text{ and}$$

the exponentially weighted moving average $b_{(i)}$ according to the equation $$b_{(i)}=b_{(i+1)}*s_{(i)}+(x_{(i)}+x_{(i+1)})/2*(1-s_{(i)})$$

or the exponentially weighted moving average $b'_{(j)}$ according to the equation $$b'_{(j)}=b'_{(j-1)}*s'_{(j)}+(x'_{(j)}+x'_{(j-1)})/2*(1-s'_{(j)}),$$

where $s_{(i)}$ are the values of the array S of size N, being smoothing coefficients, $s'_{(j)}$ are the values of the array S' of size N comprising the values of the array S in reverse order.

16. The system of claim 11, wherein the program instructions comprise instructions for calculating each value $y_{(i)}$ of the array Y according to the equation $$y_{(i)}=(a_{(i)}+b_{(i)})/2$$

or $$y_{(i)}=(a_{(i)}+b'_{(j)})/2.$$

17. The system of claim 11, wherein the program instructions comprise instructions for calculating each value $y_{(i)}$ of the array Y according to the equation $$y_{(i)}=abs(x_{(i)}-(a_{(i)}+b_{(i)})/2)\hat{\,}g$$

or $$y_{(i)}=abs(x_{(i)}-(a_{(i)}+b'_{(j)})/2),$$

where g is an exponent, g>0.

18. The system of claim 11, wherein the program instructions comprise instructions for calculating each value $y_{(i)}$ of the array Y according to the equation $$y_{(i)}=\max(\min(x_{(i)}, \max(a_{(i)}, b_{(i)})), \min(a_{(i)}, b_{(i)}))$$

or $$y_{(i)}=\max(\min(x_{(i)}, \max(a_{(i)}, b'_{(j)}0), \min(a_{(i)}, b'_{(j)})).$$

19. The system of claim 11, wherein the program instructions comprise instructions for calculating each value $y_{(i)}$ of the array Y according to the equation $$y_{(i)}=\max(a_{(i)}, b_{(i)})$$

or $$y_{(i)}=\max(a_{(i)}, b'_{(j)}).$$

20. The system of claim 11, wherein the program instructions comprise instructions for calculating each value $y_{(i)}$ of the array Y according to the equation $$y_{(i)}=\min(a_{(i)}, b_{(i)})$$

or $$y_{(i)}=\min(a_{(i)}, b'_{(j)}).$$

21. One or more non-transitory computer readable storage medium comprising
program instructions stored thereon, comprising
program instructions for implementing a method of processing a digital image, the method comprising
receiving a digital image representing a two-dimensional array of pixel colour values arranged in rows and columns,
modifying each row of pixel colour values and then each column of modified pixel colour values or, alternatively, each column of pixel colour values and then each row of modified pixel colour values, represented as an array X of pixel or modified pixel colour values x(i), by calculating each value y(i) of an array Y as a function at least of
an exponentially weighted moving average a(i) of the array X, calculated in ascending order of the array X value indices, and
an exponentially weighted moving average b(i) of the array X, calculated in descending order of the array X value indices, or an exponentially weighted moving average b'(j) of an array X' containing the values of the array X in reverse order, calculated in ascending order of the array X' value indices,
where i, j are the array value indices, wherein 0≤i<N, j=N−1−i, N is the array size,
with replacement of x(i) with y(i).

22. One or more non-transitory computer readable storage medium of claim 21, wherein the program instructions comprise instructions for calculating the exponentially weighted moving average $a_{(i)}$ according to the equation $$a_{(i)}=a_{(i-1)}*w+x_{(i)}*(1-w) \text{ and}$$

the exponentially weighted moving average $b_{(i)}$ according to the equation $$b_{(i)}=b_{(i+1)}*w+x_{(i)}*(1-w)$$

or the exponentially weighted moving average $b'_{(j)}$, according to the equation $$b'_{(j)}=b'_{(j-1)}*w+x'_{(j)}*(1-w),$$

where w is a smoothing coefficient.

23. One or more non-transitory computer readable storage medium of claim 21, wherein the program instructions comprise instructions for calculating the exponentially weighted moving average $a_{(i)}$ according to the equation $$a_{(i)}=a_{(i-1)}*s_{(i)}+x_{(i)}*(1-s_{(i)}) \text{ and}$$

the exponentially weighted moving average $b_{(i)}$ according to the equation $$b_{(i)}=b_{(i+1)}*s_{(i)}+x_{(i)}*(1-s_{(i)})$$

or the exponentially weighted moving average $b'_{(j)}$ according to the equation $$b'_{(j)}=b'_{(j-1)}*s'_{(j)}+x'_{(j)}*(1-s'_{(j)}),$$

where $s_{(i)}$ are the values of the array S of size N, being smoothing coefficients, $s'_{(j)}$ are the values of the array S' of size N comprising the values of the array S in reverse order.

24. One or more non-transitory computer readable storage medium of claim 21, wherein the program instructions comprise instructions for calculating the exponentially weighted moving average $a_{(i)}$ according to the equation $$a_{(i)}=a_{(i-1)}*w+(x_{(i)}+x_{(i-1)})/2*(1-w) \text{ and}$$

the exponentially weighted moving average $b_{(i)}$ according to the equation $$b_{(i)}=b_{(i+1)}*w+(x_{(i)}+x_{(i+1)})/2*(1-w)$$

or the exponentially weighted moving average $b'_{(j)}$ according to the equation $$b'_{(j)}=b'_{(j-1)}*w+(x'_{(j)}+x'_{(j-1)})/2*(1-w),$$

where w is a smoothing coefficient.

25. One or more non-transitory computer readable storage medium of claim 21, wherein the program instructions comprise instructions for calculating the exponentially weighted moving average $a_{(i)}$ according to the equation $$a_{(i)}=a_{(i-1)}*s_{(i)}+(x_{(i)}+x_{(i-1)})/2*(1-s_{(i)}) \text{ and}$$

the exponentially weighted moving average $b_{(i)}$ according to the equation $$b_{(i)}=b_{(i+1)}*s_{(i)}+(x_{(i)}+x_{(i+1)})/2*(1-s_{(i)})$$

or the exponentially weighted moving average $b'_{(j)}$ according to the equation $$b'_{(j)}=b'_{(j-1)}*s'_{(j)}+(x'_{(j)}+x'_{(j-1)})/2*(1-s'_{(j)}),$$

where $s_{(i)}$ are the values of the array S of size N, being smoothing coefficients, $s'_{(j)}$ are the values of the array S' of size N comprising the values of the array S in reverse order.

26. One or more non-transitory computer readable storage medium of claim 21, wherein the program instructions comprise instructions for calculating each value $y_{(i)}$ of the array Y according to the equation $$y_{(i)}=(a_{(i)}+b_{(i)})/2$$

or $$y_{(i)}=(a_{(i)}+b'_{(j)})/2.$$

27. One or more non-transitory computer readable storage medium of claim 21, wherein the program instructions comprise instructions for calculating each value $y_{(i)}$ of the array Y according to the equation $$y_{(i)}=\mathrm{abs}(x_{(i)}-(a_{(i)}+b_{(i)})/2)\char`\^ g$$

or $$y_{(i)}=\mathrm{abs}(x_{(i)}-(a_{(i)}+b'_{(j)})/2)\char`\^ g,$$

where g is an exponent, g>0.

28. One or more non-transitory computer readable storage medium of claim 21, wherein the program instructions comprise instructions for calculating each value $y_{(i)}$ of the array Y according to the equation $$y_{(i)}=\max(\min(x_{(i)}, \max(a_{(i)}, b_{(i)})), \min(a_{(i)}, b_{(i)}))$$

or $$y_{(i)}=\max(\min(x_{(i)}, \max(a_{(i)}, b'_{(j)})), \min(a_{(i)}, b'_{(j)})).$$

29. One or more non-transitory computer readable storage medium of claim 21, wherein the program instructions comprise instructions for calculating each value $y_{(i)}$ of the array Y according to the equation $$y_{(i)}=\max(a_{(i)}, b_{(i)})$$

or $$y_{(i)}=\max(a_{(i)}, b'_{(j)}).$$

30. One or more non-transitory computer readable storage medium of claim 21, wherein the program instructions comprise instructions for calculating each value $y_{(i)}$ of the array Y according to the equation $$y_{(i)}=\min(a_{(i)}, b_{(i)})$$

or $$y_{(i)}=\min(a_{(i)}, b'_{(j)}).$$

* * * * *